United States Patent
Hitt et al.

(10) Patent No.: US 11,676,467 B2
(45) Date of Patent: *Jun. 13, 2023

(54) SYSTEMS AND METHODS TO PROVIDE A WATCH AS A DASHBOARD OF A PLURALITY OF MODULES BY UTILIZING A MESH PROTOCOL

(71) Applicant: GoX Studio, Inc., Phoenix, AZ (US)

(72) Inventors: Joseph Karl Hitt, Scottsdale, AZ (US); Robert Bruce Floersheim, West Chester, PA (US)

(73) Assignee: GoX Studio, Inc., Phoenix, AZ (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/367,142

(22) Filed: Jul. 2, 2021

(65) Prior Publication Data

US 2022/0036712 A1    Feb. 3, 2022

Related U.S. Application Data

(63) Continuation of application No. 16/942,530, filed on Jul. 29, 2020, now Pat. No. 11,055,979.

(51) Int. Cl.
*G08B 21/18* (2006.01)
*G08B 21/02* (2006.01)
(Continued)

(52) U.S. Cl.
CPC ............ *G08B 21/02* (2013.01); *G08B 21/18* (2013.01); *H04B 1/385* (2013.01); *H04W 84/12* (2013.01)

(58) Field of Classification Search
CPC ........ G08B 21/02; G08B 21/18; H04B 1/385; H04W 84/12
See application file for complete search history.

(56) References Cited

U.S. PATENT DOCUMENTS 7,027,621 B1    4/2006 Prokoski
9,579,060 B1    2/2017 Lisy
(Continued)

FOREIGN PATENT DOCUMENTS

WO    WO 2013082173    * 11/2012    ......... A61B 5/02438
WO    WO 2016019250    * 7/2015    ........... A61B 5/6844
(Continued)

OTHER PUBLICATIONS

Definition of correlate. Merriam-Webster Dictionary, retrieved on May 18, 2021; Retrieved from the Internet: <https://www.merriam-webster.com/dictionary/correlate> (Year: 2021) 1 page.
(Continued)

*Primary Examiner* — Hongmin Fan
(74) *Attorney, Agent, or Firm* — Esplin & Associates, PC

(57) ABSTRACT

Systems and methods to provide a watch as a dashboard of a plurality of components by utilizing a mesh protocol are disclosed. Exemplary implementations may: generate output signals, by a module group of one or more modules, configured to conveying information related to the subject, wherein the one or more modules are configured by a mesh protocol to communicate the information via wireless communication; by one or more processors of a watch: receive wireless communication from at least a first module via the mesh protocol; obtain the output signals from the module group based on the mesh protocol; perform analysis on the output signals to determine values to one or more metrics related to the subject; and effectuate, via a user interface of the watch, presentation of the values, wherein the watch includes one or more sensors, and a transmitter receiver that communicates via the mesh protocol.

11 Claims, 4 Drawing Sheets

(51) Int. Cl.
*H04B 1/3827* (2015.01)
*H04W 84/12* (2009.01)

(56) References Cited

U.S. PATENT DOCUMENTS

| | | |
|---|---|---|
| 9,980,112 B1 | 5/2018 | Newby |
| 10,307,101 B1 | 6/2019 | Miller |
| 10,959,056 B1 | 3/2021 | Alsahlawi |
| 11,055,979 B1 | 7/2021 | Hitt |
| 11,205,518 B1 | 12/2021 | Hitt |
| 11,229,407 B2 | 1/2022 | Hitt |
| 2007/0158128 A1 | 7/2007 | Gratz |
| 2007/0167162 A1 | 7/2007 | Kim |
| 2009/0005652 A1 | 1/2009 | Kurtz |
| 2011/0029465 A1 | 2/2011 | Ito |
| 2011/0047508 A1 | 2/2011 | Metzler |
| 2012/0001876 A1 | 1/2012 | Chervenka |
| 2012/0143019 A1 | 6/2012 | Russell |
| 2012/0249797 A1 | 10/2012 | Haddick |
| 2014/0222522 A1 | 8/2014 | Chait |
| 2015/0242769 A1 | 8/2015 | Kezeu |
| 2015/0358043 A1 | 12/2015 | Jeong |
| 2016/0038083 A1 | 2/2016 | Ding |
| 2016/0058364 A1 | 3/2016 | Ionescu |
| 2016/0235374 A1 | 8/2016 | Miller |
| 2016/0278700 A1 | 9/2016 | Lee |
| 2016/0292988 A1 | 10/2016 | McCleary |
| 2016/0302498 A1* | 10/2016 | Kreft ............... A41D 19/0017 |
| 2017/0046496 A1 | 2/2017 | Johnstone |
| 2017/0303187 A1 | 10/2017 | Crouthamel |
| 2017/0319130 A1 | 11/2017 | Thomas |
| 2018/0033279 A1 | 2/2018 | Chong |
| 2018/0081912 A1 | 3/2018 | Suleiman |
| 2018/0144427 A1 | 5/2018 | Ebesu |
| 2018/0147913 A1 | 5/2018 | Bergin |
| 2018/0153463 A1 | 6/2018 | Nissila |
| 2018/0330302 A1 | 11/2018 | Peterson |
| 2019/0008687 A1 | 1/2019 | Ishiura |
| 2019/0073618 A1 | 3/2019 | Kanukurthy |
| 2019/0086875 A1 | 3/2019 | Cardinali |
| 2019/0117170 A1 | 4/2019 | Begtrup |
| 2019/0134396 A1 | 5/2019 | Toth |
| 2019/0298261 A1 | 10/2019 | Savchenko |
| 2019/0311809 A1 | 10/2019 | Young |
| 2019/0343429 A1 | 11/2019 | Elhawary |
| 2020/0194124 A1 | 6/2020 | Kramer |
| 2020/0205747 A1 | 7/2020 | Mulligan |
| 2020/0260973 A1 | 8/2020 | Prstojevich |
| 2020/0279339 A1 | 9/2020 | Akutagawa |
| 2020/0302452 A1 | 9/2020 | Platt |
| 2021/0378600 A1 | 12/2021 | Hitt |

FOREIGN PATENT DOCUMENTS

| | | | | |
|---|---|---|---|---|
| WO | WO 2018007933 | * | 7/2017 | ......... A61B 5/02055 |
| WO | 2017165037 | | 9/2017 | |

OTHER PUBLICATIONS

Definition of value. Merriam-Webster Dictionary, retrieved on May 18, 2021; Retrieved from the Internet: <https:// www.merriam-webster.com/dictionary/value> (Year: 2021) 1 page.

* cited by examiner

SYSTEMS AND METHODS TO PROVIDE A WATCH AS A DASHBOARD OF A PLURALITY OF MODULES BY UTILIZING A MESH PROTOCOL

FIELD OF THE DISCLOSURE

The present disclosure relates to systems and methods to provide a watch as a dashboard of a plurality of modules by utilizing a mesh protocol.

BACKGROUND

In various circumstances, it may be convenient to provide information to a subject via a wearable watch. For example, the subject may be an elder, a soldier, an on-site construction worker, among others. Communication of information via a mesh network is known. However, providing the information, particularly information related to subject or a contextual environment of the subject, via the communication over the mesh network to the watch may ensure visibility by the subject without nuisance of an additional device (e.g., smartphone).

SUMMARY

One aspect of the present disclosure relates to a system configured to provide a watch as a dashboard of a plurality of modules by utilizing a mesh protocol. The individual modules may include one or more sensors that conveying information related to a subject. In some implementations, the subject may wear some of the modules. Other modules may be related to, for example, a living facility of the subject, a workplace of the subject, and/or machinery operable by the subject (e.g., forklift, car, motorized wheelchair, etc.). The modules may be configured by a mesh protocol to facilitate communication of information from individual modules to a watch wearable by the subject. The watch may be configured to perform analysis on the information to determine values to one or more metrics. The one or more metrics may be related to biometrics of the subject (e.g., future fitness, body temperature, balance, etc.), ambient conditions of the subjects, and/or other metrics. Such values may be presented via a user interface of the watch to facilitate productivity and/or functionality of the subject within a contextual environment.

The system may include one or more of a module group, a watch, and/or other components. The module group may include one or more modules configured to generate output signals conveying information related to one or more of a location of a subject, ambient conditions of the subject, biometrics of the subject, motion of the subject, machinery operable by the subject, and/or other information related to the subject. Some modules of the module group may be wearable by the subject. By way of non-limiting example, the module group may include a first module wearable by the subject. The one or more modules may be configured by a mesh protocol to communicate the information via wireless communication.

The watch may include one or more processors, one or more sensors, a transmitter receiver, and/or other components. The processor(s) may be configured by machine-readable instructions. Machine-readable instructions may include one or more instruction components. The instruction components may include one or more of a communication component, an analysis component, a presentation component, and/or other instruction components.

The transmitter receiver may communicate via the mesh protocol. As such, connections between the watch and the one or more modules may facilitate communication between the watch and the one or more modules via the mesh protocol.

The communication component may be configured to receive the wireless communication from at least the first modules via the mesh protocol. In some implementations, the wireless communication may be received by one or more other modules of the module group. The communication component may be configured to obtain the output signals from the module group based on the mesh protocol.

The analysis component may be configured to perform analysis on the output signals to determine values to one or more metrics related the subject. The one or more metrics may indicate the information related to the location of a subject, the ambient conditions of the subject, the biometrics of the subject, the motion of the subject, the machinery operable by the subject, and/or other information.

The presentation component may be configured to effectuate, via a user interface of the watch, presentation of the values to the one or more metrics.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
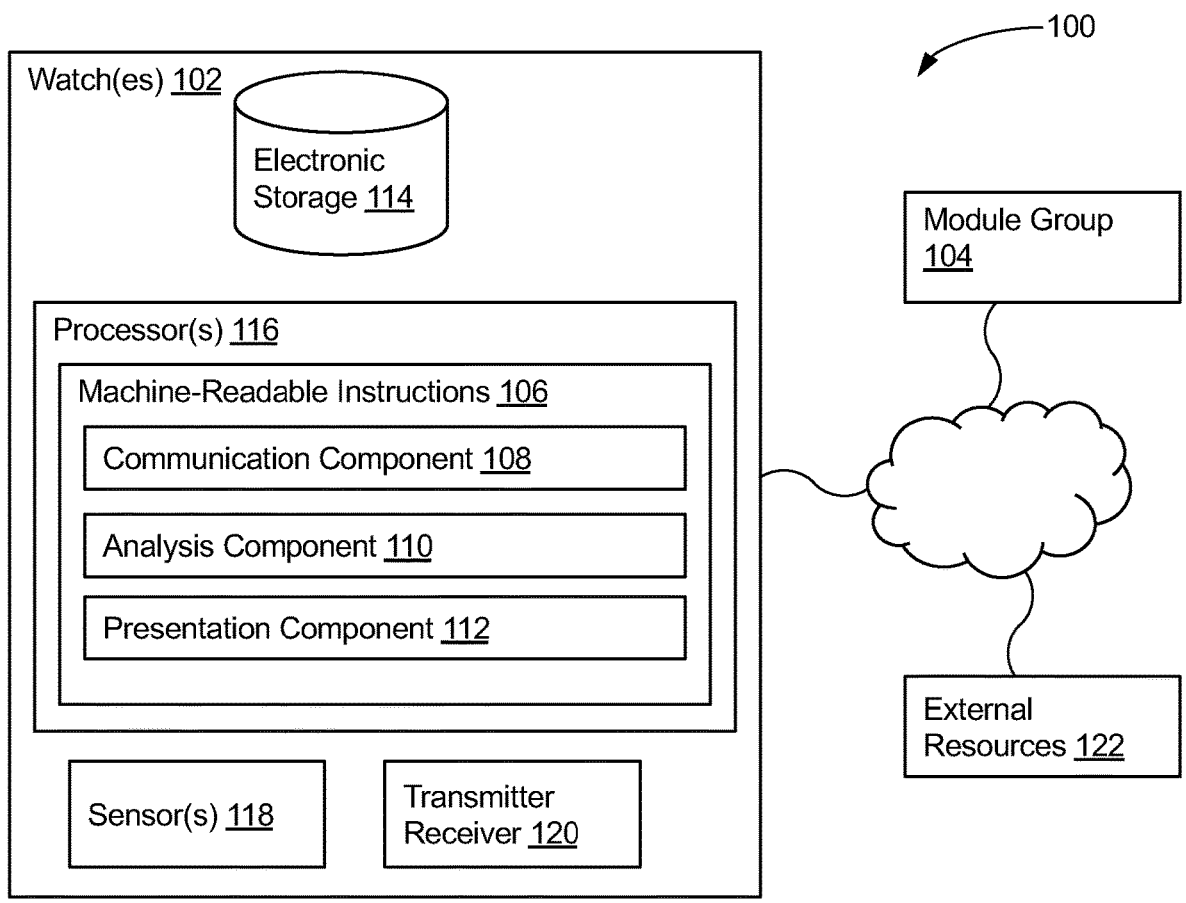
FIG. 1 illustrates a system configured to provide a watch as a dashboard of a plurality of components by utilizing a mesh protocol, in accordance with one or more implementations.

FIG. 1 illustrates a system 100 configured to provide a watch as a dashboard of a plurality of modules by utilizing a mesh protocol, in accordance with one or more implementations. In some implementations, system 100 may include one or more of a watch 102, a module group 104, and/or other components.

Module group 104 may include one or more modules. The one or more modules may be configured to generate output signals conveying information related to one or more of a location of a subject, ambient conditions of the subject, biometrics of the subject, motion of the subject, machinery operable by the subject, and/or other information related to the subject. The output signals may be analog signals, digital signals, encoded signals, combinations thereof, and/or other signals. The one or more modules may include one or more of an ambient condition sensor, a location sensor, temperature sensor, an orientation sensor, a pressure sensor, a micro-location sensor, a telematics device, a module wearable by other subjects, insole module, chest module, and/or other sensors or modules. In some implementations, individual ones of the one or more modules may be wearable by and associated with individual ones of the other subjects.

In some implementations, a location sensor may be configured to generate output signals conveying information related to the location of the subject and/or other information. The information related to the location derived from output signals of a location sensor may define one or more of a geo-location of the subject, an elevation of the subject, and/or other measurements. A location sensor may include one or more of a GPS, an altimeter, and/or other devices. The location of the subject may be a location of a contextual environment of the subject. The contextual environment may be the immediate space surrounding the subject and of which the subject is operating and/or working in. The immediate area may be a particular radius surrounding the subject defined by the location sensor, an operator user, the subject, and/or by other definition. The contextual environment may change over time upon obtainment of an assigned route and/or a predicted route of the subject.

The micro-location sensor may be configured to generate output signals related to a micro-location of the subject and/or other information. The information related to the micro-location derived from output signals of a micro-location sensor may define a more precise placement of the subject indoors (e.g., in a living facility, in a hotel, etc.) and outdoors (e.g., in a large worksite). The more precise placement of the subject may be within feet (e.g., 3 feet) or within inches (e.g., 6 inches) of an actual placement of the subject.

The information related to the motion of the subject may include acceleration, orientation, speed of motion, joint angles, and/or other information related to the motion of the subject. An orientation sensor may be configured to generate output signals conveying orientation information and/or other information. Orientation information derived from output signals of an orientation sensor may define an orientation of the subject. In some implementations, orientation may refer to one or more of a pitch angle, a roll angle, a yaw angle, heading, pointing direction, and/or other measurements. An orientation sensor may include an inertial measurement unit (IMU) such as one or more of an accelerometer, a gyroscope, a magnetometer, Inclinometers, Electronic nose, Infrared Imagers, Micro-bolometers, micro-displays (DMD), Digital micro-mirror device, Optical Switches, and/or other devices.

A pressure sensor may be configured to generate output signals conveying pressure information and/or other information. Pressure information derived from output signals of a pressure sensor may define a force per unit area imparted to the pressure sensor. A pressure sensor may include one or more of a piezoresistive strain gauge, a capacitive pressure sensor, an electromagnetic pressure sensor, a piezoelectric sensor, a strain-gauge, and/or other pressure sensors. In some implementations, an insole module may include one or more pressure sensors. In some implementations, the one or more pressure sensors in an insole of the subject may convey information related to balance of the subject, posture of the subject, load distribution, strain on the subject (e.g., standing too long), and/or other information.

A temperature sensor may be configured to generate output signals conveying information related to the temperature of the subject and/or other information. The information related to the temperature of the subject derived from output signals of a temperature sensor may define one or more of a temperature at the temperature sensor, temperature within a threshold range of the temperature sensor, biometric information, and/or other measure of temperature of the subject. The biometric information may include one or more of skin temperature readings, internal body temperature readings, and/or other readings. In some implementations, the information related to the temperature of the subject may define one or more of a temperature at the temperature sensor, temperature within a threshold range of the temperature sensor, and/or other measure of temperature of a contextual environment of the subject. A temperature sensor may include one or more of a thermocouple, a resistive temperature Measuring device, an infrared sensor, a bimetallic device, a thermometer, and/or other temperature sensors. In some implementations, the chest module worn by the subject may include a temperature sensor.

One or more cardiovascular sensors may be configured to generate output signals conveying biometric information related to heart, lungs, and circulation of the subject. The biometric information may include values for the cardiovascular parameters of the subject, and/or other values for other biometric parameters. The cardiovascular parameters may include heart rate, a resting heart rate of the subject, a respiratory rate of the subject, blood pressure of the subject, oxygen saturation of the subject, heart variability, heartbeat strength, heartbeat rhythm, and/or other cardiovascular parameters. The one or more cardiovascular sensors may include one or more an electrodermal activity (EDA), an electrocardiography (EKG or ECG) sensor, a blood volume pulse (BVP) sensor, a respiration sensor, a blood pressure sensor, and/or other cardiovascular sensors. Other sensors that may convey the biometric information may include one or more of an electrodermal activity (EDA), an electromyography (EMG) sensor, and/or other sensors. In some implementations, the chest module worn by the subject may include the one or more cardiovascular sensors. Thus, the output signals conveying the information related to the biometrics of the subject may be generated by the modules wearable by the subject.

An ambient condition sensor may be configured to generate output signals conveying ambient condition information of the contextual environment of the subject. By way of non-limiting example, the contextual environment may be an outdoor environment (e.g., a worksite), a factory, a warehouse, a room in a living facility, a particular room in a building, and/or other contextual environment. The ambient condition information derived from the output signals of an ambient condition sensor may define one or more of a temperature (e.g., a room temperature, outdoor temperature), a peak temperature, an air temperature, humidity, precipitation, an ultraviolet index, visibility, pressure, dew point, wind direction, wind gust, cloud coverage, and/or other ambient condition information. The ambient condition sensor may include one or more of a rain sensor (e.g., tipping bucket rain gauge), anemometer (e.g., cup and vane sensor, propeller anemometer, ultrasonic anemometer), pyranometer, humidity sensor, temperature sensor for the contextual environment (e.g., thermostat), evaporation pan, carbon monoxide sensor, noxious gas sensor, and/or other devices.

A light sensor may be configured to generate output signals conveying ambient light information and/or other information. The ambient light information derived from output signals of a light sensor may define intensity and/or presence (or absence) of light or other electromagnetic radiation incident on the light sensor. A light sensor may include one or more of a photodiode, an active-pixel sensor, photovoltaic, and/or other sensors.

A telematics device may be configured to generate output signals conveying machine usage information related to how a given machine (e.g., a vehicle) is operated by the subject. The machinery operable by the subject may include, but is not limited to, one or more of a vehicle, a power tool (e.g., lawn mower, chainsaws, nail gun, etc.), industrial machinery (e.g., for article or product manufacturing), and/or other machinery. By way of non-limiting example, the one or more vehicles may include one or more of a motor vehicle (e.g., cars, semi-trucks, golf carts, etc.), a watercraft (e.g., fishing boats, jet skis, ships, etc.), an aircraft (e.g., jets, commercial planes, helicopters, etc.), an electric vehicle (e.g., golf carts, wheelchairs, etc.), and/or other vehicles. The vehicle may include a telematics device, or similar thereof. The machine usage information derived from output signals of the telematics device may define one or more of a speed, a braking event, a steering event, acceleration, geo-location of the vehicle, fuel usage, mileage, estimated time of arrival, idle time, time of initial operation, time of termination of operation, total time of operation, after-hours operation, vehicle diagnostics (e.g., regarding engine), seatbelt usage, and/or other information. In some implementations, the vehicle may include one or more sensors by which the machine usage information may be derived separately. For example, the vehicle may include one or more of an accelerometer, odometer, fuel consumption gauge, speed sensor, among others.

Some modules of the module group may be wearable by the subject. The one or more modules that are wearable by the subject may include the temperature sensor, the one or more cardiovascular sensors, the pressure sensor, the location sensor, the micro-location sensor, and/or other modules. By way of non-limiting example, the module group may include a first module wearable by the subject, a second module, a third module, and so forth. In some implementations, the first module may be configured to generate the output signals conveying the biometric information. In some implementations, the second module may be configured to generate the output signals conveying the information related the ambient conditions of the subject. In some implementations, the third module may be configured to generate the output signals conveying the information related the machinery operable by the subject.

The one or more modules may be configured by a mesh protocol to communicate the information via wireless communication. Thus, the information conveyed by the module group (e.g., ambient condition information, biometric information, etc.), may be communicated via the wireless communication configured by the mesh protocol. In some implementations, by way of non-limiting example, the communication of the information may be based on the (IEEE) 802.11 family of standards, the Bluetooth family of standards, and/or other mesh protocols for communication. In some implementations, the wireless communication may include one or more wireless communication connections between individual ones of the modules of the module group. For example, a first communication connection may be between the first module and the second module and a second communication connection may be between the second module and the third module. The information conveyed by the output signals generated by the third module may be communicated via the mesh protocol (i.e., via the second module and the first module) to watch 102, or components thereof.

Watch(es) 102 may include one or more processors 116, one or more sensors 118, a transmitter receiver 120, and/or other components. The processor(s) 116 may be configured by machine-readable instructions 106. Machine-readable instructions 106 may include one or more instruction components. The instruction components may include one or more of a communication component 108, an analysis component 110, a presentation component 112, and/or other instruction components.

One or more sensors 118 may be configured to generate output signals conveying information related to the subject. In some implementations, one or more sensors 118 may include the one or more cardiovascular sensors, the temperature sensor, the orientation sensor, the location sensor, the micro-location sensor, an audio input sensor, and/or other sensors. An audio input sensor may be configured to receive audio input. The audio input sensor may include a sound transducer and/or other sensor configured to convert sound (e.g., air pressure variation) into an electrical signal. By way of non-limiting illustration, an audio input sensor may include a microphone. One or more sensor 118 may be configured by the mesh protocol to communicate the information they convey via the wireless communication similar to the individual modules of module group 104.

Transmitter receiver 120 may communicate via the mesh protocol. As such, the connections (e.g., the wireless communication connections) between watch 102 and the one or more modules of module group 104 may facilitate communication between watch 102 and the one or more modules via the mesh protocol. Transmitter receiver 120 may be configured to transmit and/or receive information and/or output signals from the one or more modules. In some implementations, transmitter receiver 120 may be configured to transmit and/or receive information and/or output signals from the one or more modules at the same time. In some implementations, transmitter receiver may receive the output signals generated by one or more sensors 118. In some implementations, transmitter receiver 120 may communicate output signals conveying information related to other subjects. For example, transmitter receiver 120 may receive the output signals conveying information related to other subjects from one or more modules related to a second subject and transmit the output signals to a second watch 102 worn by and associated with the second subject. That is, transmitter receiver 120 may be part of the mesh protocol to communicate information to a destination (e.g., the second watch 102).

Communication component 108 may be configured to receive the wireless communication from at least one of the modules of the module group via the mesh protocol. By way of non-limiting example, the wireless communication from the first module may be received via the mesh protocol. Communication component 108 may be configured to obtain the output signals generated by individual modules of module group 104 based on the mesh protocol. Communication component 108 may be configured to obtain the output signals generated by one or more sensors 118 based on the mesh protocol.

For example, the ambient condition information (from the second module) may be communicated to watch 102 via the mesh protocol. That is, the output signals conveying the ambient condition information may be obtained by communication component 108 through the first module, not directly from the second module.

As another example, the machine usage information related the machinery (from the third module) may be communicated to watch 102, particularly communication component 108, via the second module. That is, rather than the output signals conveying the machine usage information being communicated directly to watch 102, the output signals are communicated via the second module and subsequently via the first module to communication component 108. In some implementations, the information conveyed by individual modules may be communicated directly to watch 102.

Analysis component 110 may be configured to perform analysis on the output signals to determine values to one or more metrics related the subject. The one or more metrics may include a current fitness metric, a future fitness metric, a thermal stress and dehydration metric, a water loss metric, an oxygen consumption metric, a maximal oxygen consumption metric, an ambient condition metric, an exertion metric, and/or other metrics related to the subject.

The values to the current fitness of the subject may correspond to a real-time state of health of the subject to perform actions. In some implementations, the real-time state of health of the subject may refer to a general state of health at a given time to function properly based on the values of the one or more metrics described. Functioning properly may include, by way of non-limiting example, the ability to stand, walk, feed oneself, and/or other everyday functions. By way of non-limiting example, actions may include walking, running, lifting, and/or other movement by the subject.

The values to the future fitness of the subject may correspond to a future state of health of the subject. The future state of health may refer to a general state of health at a particular point in time in the future to function properly and/or perform the actions. The one or more values to the future fitness metric may indicate the fitness of the subject predicted at particular points in time in the future. The particular points in time in the future may in an hour, in 30 minutes, in 2 hours, in 5 hours, and/or other length of time in the future. In such implementations, determining the values of the second metric may include forecast modeling, time series modeling, average risk prediction modeling, weighted average modeling, machine learning, combinations thereof, and/or other determination techniques.

The values to the current oxygen consumption metric may indicate a volume of oxygen currently consumed by the subject at the particular point in time. The values to the maximal oxygen consumption metric may characterize a maximum volume of oxygen the subject has ever consumed.

The values to the exertion metric may correlate with exertion of the subject due to work. As used herein, the term "correlate" (and derivatives thereof) may include estimate, quantify, correspond to, combinations thereof, and/or other terms that refer to a relationship in which one value indicates another value. The exertion of the subject may be the use the energy by the subject due to the work exerted by the subject. The work exerted may be the product of force and displacement of an object. The weight of the object and the displacement of the object may be input (via a user interface of watch 102) prior to exertion of the work by the subject.

The values to the water loss metric may correlate with estimated percentage of bodyweight of the subject lost in water. The water loss metric may be a system of measurement of how much water (e.g., sweat) the subject has lost. The values of the water loss metric may indicate the estimated percentage, or otherwise estimated amount, of bodyweight loss of the subject.

The values to the thermal stress and dehydration metric may indicate a risk related to thermal stress and dehydration that the subject is susceptible to. Dehydration in addition to thermal stress of the body of the subject may include an increase in core body temperature, an increase in heart rate, an increase in oxygen consumption, a decrease in work, a decrease in efficiency of the work, a global cardiopulmonary and neural muscular chain reaction that may decrease cardiac output, stroke volume, cognitive function, and mechanical output, and/or other negative effect.

The values to the ambient condition metrics may correlate with a current heat index and a future heat index. In some implementations, a heat index may be a temperature of a contextual environment of the subject. The current heat index may represent a current temperature of the contextual environment that surrounds the subject. The future heat index may represent a future temperature the contextual environment may reach on a particular day. The future heat index may represent a future peak temperature of which may be the highest temperature of the particular day. The values to the ambient condition metrics may be based on the output signals of the ambient condition sensor.

In some implementations, the values to the metrics described herein may be derived from the output signals (e.g., from the one or more sensors of the modules) by analysis component 110. The values to the individual metrics may be determined based on the output signals generated by the one or more modules so that a plurality of information related to the subject is considered. For example, the values to the water loss metric may be determined based on the output signals generated by the temperature sensor and the one or more cardiovascular sensors of a module worn by the subject. For example, the values to the thermal stress and dehydration metric may be determined based on the output signals generated by the temperature sensor and the one or more cardiovascular sensors of a module worn by the subject, and the ambient condition sensor of a module in the contextual environment. The values to individual metrics may be stored in electronic storage 114 upon determination or derivation. In some implementations, the values to the individual metrics stored may be associated with a corresponding date and/or time.

In some implementations, the micro-location information conveyed by the output signals generated by the micro-location sensor (e.g., present in watch 102) may define a more precise location of the subject. Analysis component 110 may be configured to utilize the precise location to determine whether the subject is nearing a particular micro-location. In some implementations, the particular micro-location may be dangerous particular for the subject. In some implementations, the particular micro-location may be known (e.g., a cliff side) and/or set via a user interface of watch 102 based on subject input or user input. For example, analysis component 110 may be configured to determine whether the subject is nearing open water (e.g., a pool), unstable ground (e.g., loose rock), a change in ground elevation (e.g., a curb to a street, steep path, etc.), and/or other particular micro-locations.

Presentation component 112 may be configured to effectuate presentation of the values to the one or more metrics, determinations based on the output signals, and/or other information. The presentation may be via the user interface of watch 102. The user interface of watch 102 may be used to present information to the subject wearing watch 102 in real-time. The user interface of watch 102 may provide the subject visibility to the information related to the subject themselves in addition to the contextual environment(s) that the subject is in or may be in. For example, presentation component 112 may effectuate presentation of a current heart rate, body temperature, beats per minute, balance, among others, related to the subject. In some implementations, presentation component 112 may effectuate presentation of notifications and/or alerts related to the values of the metrics. In some implementations, presentation component 112 may effectuate presentation of the determination that the locations and/or the micro-location of the subject is nearing some particular location and/or micro-location (e.g., dangerous area).

In some implementations, providing the visibility via the user interface of watch 102 may safeguard the subject from distractions that may arise from viewing the information on a smartphone, for example, that may be used for personal matters. In some implementations, watch(es) 102 may be dedicated to occupational purposes. In some implementations, providing the visibility via the user interface of watch(es) 102 may provide convenience so that the subject does not need to carry a device (e.g., smartphone) or an additional device. For example, for occupational purposes, the subject wearing watch 102 may eliminate carrying a smartphone to view the information. As another example, for assisted living purposes, the subject wearing watch 102 may eliminate remembering to possess a smartphone. In such instances, watch 102 may maintain visibility of the information at any time or when necessary, and not be a nuisance.

Figure 3:
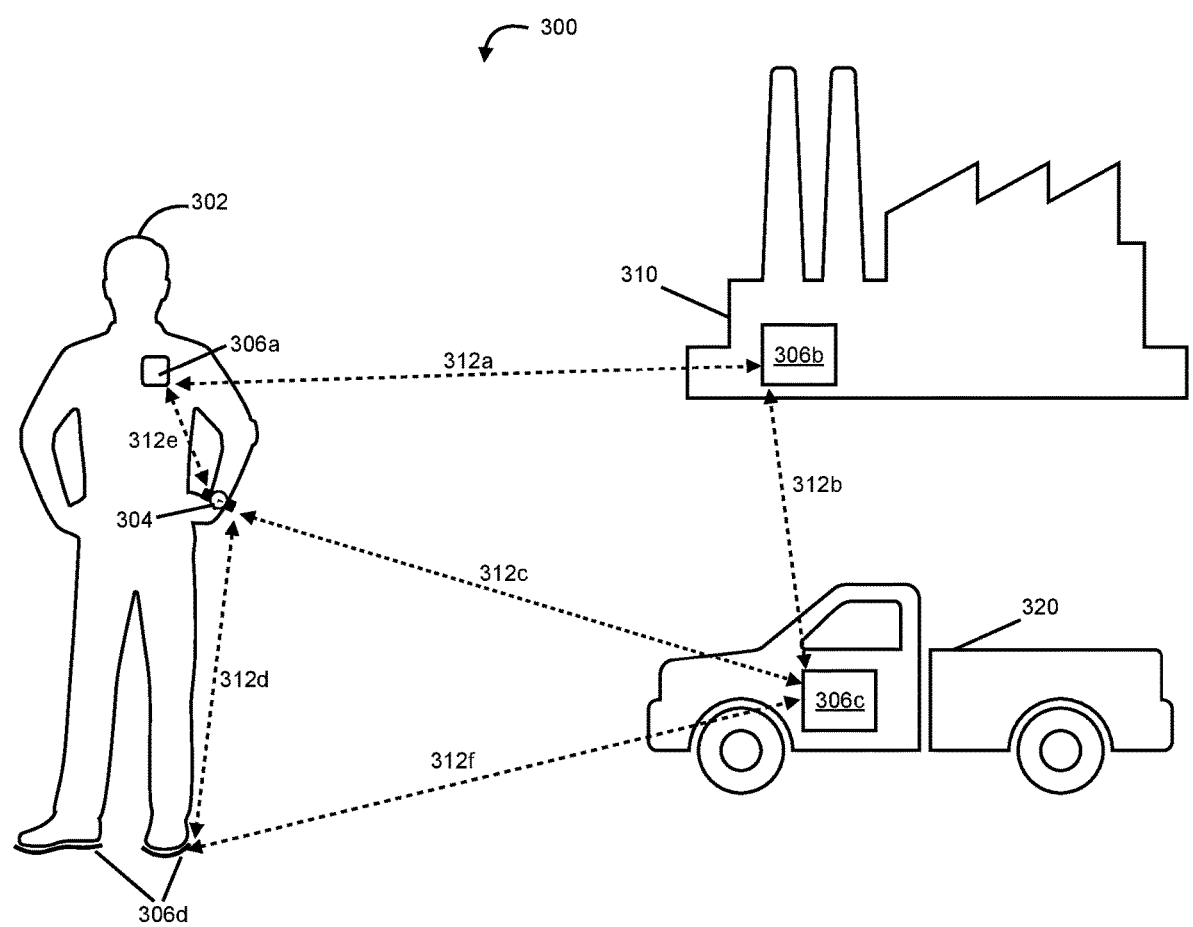
FIG. 3 illustrates an example implementation of a system configured to provide a watch as a dashboard of a plurality of components by utilizing a mesh protocol, in accordance with one or more implementations.

FIG. 3 may illustrate an example implementation of a system configured to provide a watch as a dashboard of a plurality of components by utilizing a mesh protocol, in accordance with one or more implementations. FIG. 3 may illustrate a mesh network 300. Mesh network 300 may facilitate wireless communication from modules 306a, 306b, 306c, and 306d to a watch 304 worn by a subject 302. Module 306a may be worn on a chest of subject 302. Module 306a may generate output signals conveying biometric information of subject 302. Module 306b may be associated with and present at a workplace 310 of subject 302. Module 306b may include, for example, a temperature sensor and carbon monoxide sensor to generate output signals conveying ambient conditions of workplace 310. Module 306c may be associated with and present in a vehicle 320 operated by subject 302. Module 306c may generate output signals conveying machine usage information of vehicle 320. Module 306d may be worn in shoes (e.g., as insoles) of subject 302. Module 306d may include pressure sensors that generate output signals conveying posture and balance of subject 302.

Mesh network 300 may include wireless communication connections 312a-f so that information from one module may be communicated to watch 302 either directly or via other modules and other wireless communication connections. For example, the ambient condition information conveyed by module 306b may be communicated via module 306a and communication connections 312a and 312e or via module 306c and communication connections 312b and 312c.

In some implementations, where communication connection 312a and 312c disconnect or cease to exist, the machine usage information may be received by watch 304 via modules 306d and communication connections 312f and 312d and the ambient condition information may be received by watch 304 via modules 306c and 306d and communication connections 312b, 312f, and 312d. It is to be understood that such example is for illustrative purposes only and is not intended to be limiting. At any time when one or more communication connections are disconnected, the information conveyed by the modules may be communicated to watch 304 via other modules and other communication connections in accordance with mesh protocols.

Figure 4:
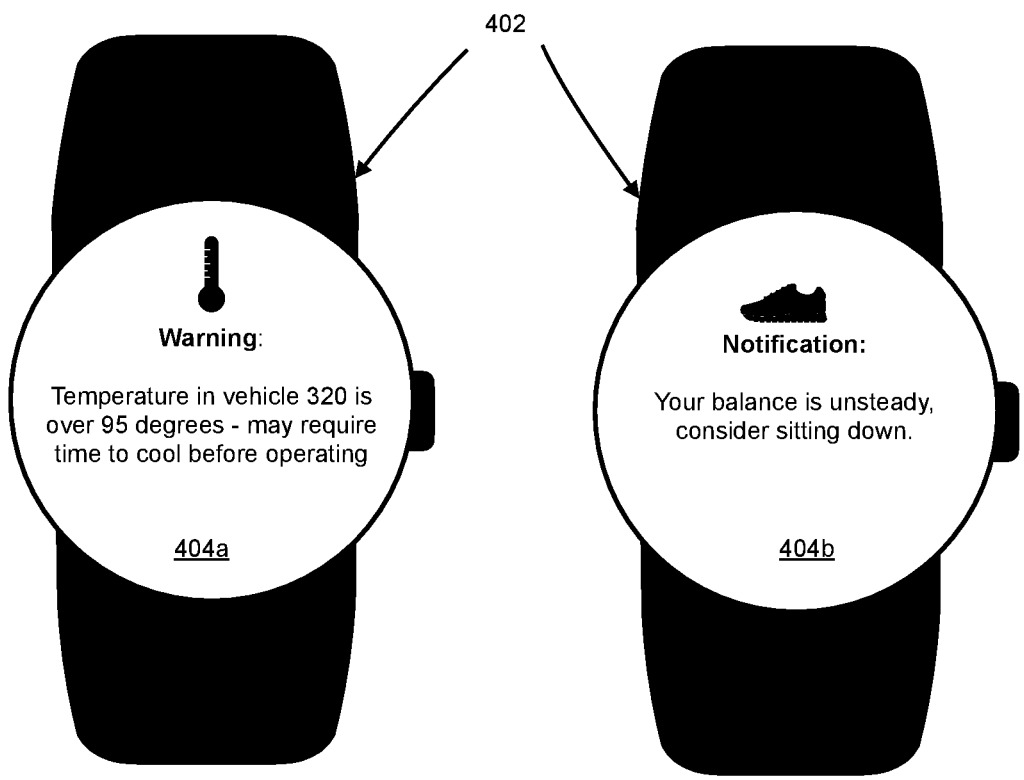
FIG. 4 illustrates an example implementation of a system configured to provide a watch as a dashboard of a plurality

FIG. 4 may illustrate an example implementation of a system configured to provide a watch as a dashboard of a plurality of components by utilizing a mesh protocol, in accordance with one or more implementations. FIG. 4 may illustrate user interfaces 404a and 404b of watch 402. User interface 404a may display a warning related to the temperature of vehicle 320 of subject 302 of FIG. 3. The warning may be based on values determined from the output signals generated by module 306c. User interface 404b may display a notification about the balance of subject 302 (of FIG. 3) based on values determined from the output signals generated by module 306d.

Referring back to FIG. 1, in some implementations, watch(es) 102, module group 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which watch(es) 102, module group 104, and/or external resources 122 may be operatively linked via some other communication media.

External resources 122 may include sources of information outside of system 100, external entities participating with system 100, and/or other resources. In some implementations, some or all of the functionality attributed herein to external resources 122 may be provided by resources included in system 100.

Watch(es) 102 may include electronic storage 114, one or more processors 116, and/or other components. Watch(es) 102 may include communication lines, or ports to enable the exchange of information with a network and/or other watches. Illustration of watch(es) 102 in FIG. 1 is not intended to be limiting. Watch(es) 102 may include a plurality of hardware, software, and/or firmware components operating together to provide the functionality attributed herein to watch(es) 102. For example, watch(es) 102 may be implemented by a cloud of computing platforms operating together as watch(es) 102.

Electronic storage 114 may comprise non-transitory storage media that electronically stores information. The electronic storage media of electronic storage 114 may include one or both of system storage that is provided integrally (i.e., substantially non-removable) with watch(es) 102 and/or removable storage that is removably connectable to watch(es) 102 via, for example, a port (e.g., a USB port, a firewire port, etc.) or a drive (e.g., a disk drive, etc.). Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 114 may include one or more virtual storage resources (e.g., cloud storage, a virtual private network, and/or other virtual storage resources). Electronic storage 114 may store software algorithms, information determined by processor(s) 116, information received from watch(es) 102, information received from module group 104, and/or other information that enables watch(es) 102 to function as described herein.

Processor(s) 116 may be configured to provide information processing capabilities in watch(es) 102. As such, processor(s) 116 may include one or more of a digital processor, an analog processor, a digital circuit designed to process information, an analog circuit designed to process information, a state machine, and/or other mechanisms for electronically processing information. Although processor(s) 116 is shown in FIG. 1 as a single entity, this is for illustrative purposes only. In some implementations, processor(s) 116 may include a plurality of processing units. These processing units may be physically located within the same device, or processor(s) 116 may represent processing functionality of a plurality of devices operating in coordination. Processor(s) 116 may be configured to execute components 108, 110, and/or 112, and/or other components. Processor(s) 116 may be configured to execute components 108, 110, and/or 112, and/or other components by software; hardware; firmware; some combination of software, hardware, and/or firmware; and/or other mechanisms for configuring processing capabilities on processor(s) 116. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 116 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 116 may be configured to execute one or more additional components that may perform some or all of the functionality attributed below to one of components 108, 110, and/or 112.

Figure 2:
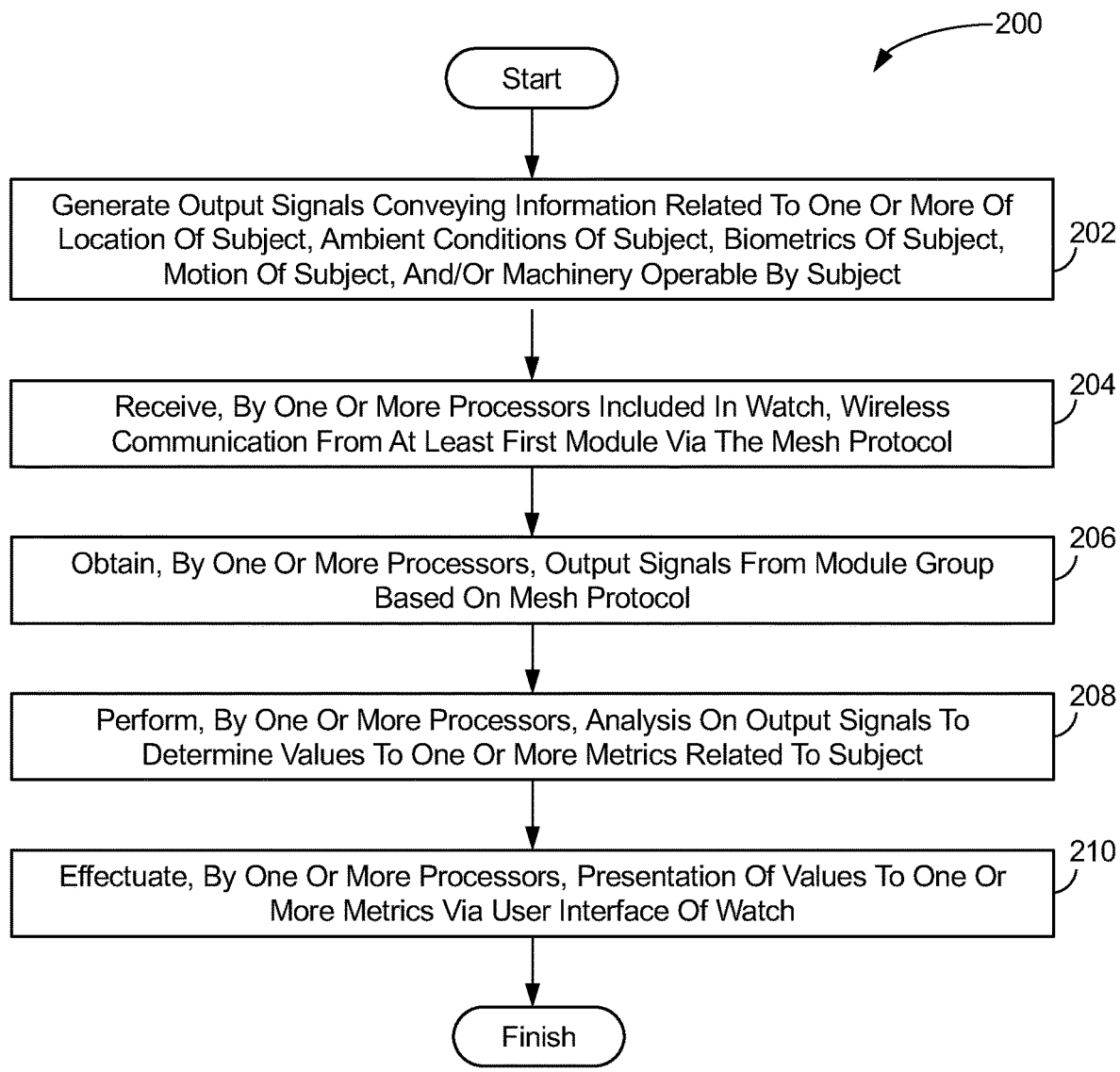
FIG. 2 illustrates a method to provide a watch as a dashboard of a plurality of components by utilizing a mesh protocol, in accordance with one or more implementations.

FIG. 2 illustrates a method 200 to provide a watch as a dashboard of a plurality of components by utilizing a mesh protocol, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals conveying information related to one or more of a location of a subject, ambient conditions of the subject, biometrics of the subject, motion of the subject, and/or machinery operable by the subject. The output signals may be generated by one or more modules of a module group. Some modules of the module group may be wearable by the subject such that the module group includes a first module wearable by the subject. The one or more modules may be configured by a mesh protocol to communicate the information via wireless communication. Operation 202 may be performed by one or more modules the same as or similar to the one or more modules of module group 104, in accordance with one or more implementations.

An operation 204 may include receiving, by one or more processors included in a watch, the wireless communication from at least the first module via the mesh protocol. The watch may further include one or more sensors, a transmitter receiver, and/or other components. The transmitter receiver may communicate via the mesh protocol such that connections between the watch and the one or more modules may facilitate communication between the watch and the one or more modules via the mesh protocol. Operation 204 may be performed by one or more hardware processors configured by machine-readable instructions including a component that is the same as or similar to communication component 108, in accordance with one or more implementations.

An operation 206 may include obtaining, by the one or more processors, the output signals from the module group based on the mesh protocol. Operation 206 may be performed by one or more hardware processors configured by machine-readable instructions including a component that is the same as or similar to communication component 108, in accordance with one or more implementations.

An operation 208 may include performing, by the one or more processors, analysis on the output signals to determine values to one or more metrics related to the subject. Operation 208 may be performed by one or more hardware processors configured by machine-readable instructions including a component that is the same as or similar to analysis component 110, in accordance with one or more implementations.

An operation 210 may include effectuating, by the one or more processors, presentation of the values to the one or more metrics via a user interface of the watch. Operation 210 may be performed by one or more hardware processors configured by machine-readable instructions including a component that is the same as or similar to presentation component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a watch as a dashboard of a plurality of modules by utilizing a mesh protocol, the system comprising:
   a module group of one or more modules configured to generate output signals conveying information related to one or more of a location of a subject, ambient conditions of the subject, biometrics of the subject, motion of the subject, and/or machinery operable by the subject, wherein some modules of the module group are wearable by the subject, wherein the one or more modules are configured by a mesh protocol to communicate the information via wireless communication, wherein the information related to the ambient conditions is communicated to the watch via the mesh protocol; and
   a watch including one or more processors, and a transmitter receiver, wherein the transmitter receiver communicates via the mesh protocol such that connections between the watch and the one or more modules facilitate communication between the watch and the one or more modules via the mesh protocol, wherein the one or more processors are configured by machine-readable instructions to:
      receive the wireless communication from at least one of the modules of the module group via the mesh protocol;
      obtain the output signals from the module group based on the mesh protocol;
      perform analysis on the output signals to determine values to one or more metrics related to the subject such that values to a thermal stress and dehydration metric for the subject are determined based on the information related to the ambient conditions of the subject, the information related to the motion of the subject, and the information related to the biometrics of the subject; and
      effectuate, via a user interface of the watch, presentation of the values to the one or more metrics including the values to the thermal stress and dehydration metric.

2. The system of claim 1, wherein the one or more metrics include a future fitness metric, a current fitness metric, the thermal stress and dehydration metric, oxygen consumption metric, and/or ambient condition metric.

3. The system of claim 1, wherein the one or more modules include one or more of an ambient condition sensor, a location sensor, a micro-location sensor, and/or a module wearable by other subjects.

4. The system of claim 1, wherein the module group includes a third module, wherein one of the modules of the module group is configured to generate the output signals conveying the information related the machinery operable by the subject, wherein the information related the machinery is communicated to the watch via the modules of the module group, and wherein the one or ore processors are further configured by the machine-readable instructions to:
   determine an interior temperature of a vehicle based on the information related to the machinery, wherein the machinery includes the vehicle; and
   effectuate, via the watch, presentation of a notification related to the interior temperature.

5. The system of claim 4, wherein the machinery includes one or more of the vehicle or a power tool, wherein the vehicle may include a motor vehicle, a watercraft, an aircraft, and/or electric vehicle.

6. A method to provide a watch as a dashboard of a plurality of modules by utilizing a mesh protocol, the method comprising:
   generating, by a module group of one or more modules, output signals conveying information related to one or more of a location of a subject, ambient conditions of the subject, biometrics of the subject, motion of the subject, and/or machinery operable by the subject, wherein some modules of the module group are wearable by the subject, wherein the one or more modules are configured by a mesh protocol to communicate the information via wireless communication, wherein the information related to the ambient conditions is communicated to the watch via the mesh protocol;
   receiving, by one or more processors of a watch, the wireless communication from at least one of the modules of the module group via the mesh protocol, wherein the watch includes a transmitter receiver, wherein the transmitter receiver communicates via the mesh protocol such that connections between the watch and the one or more modules facilitate communication between the watch and the one or more modules via the mesh protocol;
   obtaining, by the one or more processors, the output signals from the module group based on the mesh protocol;
   performing, by the one or more processors, analysis on the output signals to determine values to one or more metrics related to the subject such that values to a thermal stress and dehydration metric for the subject are determined based on the information related to the ambient conditions of the subject, the information related to the motion of the subject, and the information related to the biometrics of the subject; and
   effectuating, by the one or more processors, presentation of the values to the one or more metrics including the values to the thermal stress and dehydration metric via a user interface of the watch.

7. The method of claim 6, wherein the one or more metrics include a future fitness metric, a current fitness metric, the thermal stress and dehydration metric, oxygen consumption metric, and/or ambient condition metric.

8. The method of claim 6, wherein the one or more modules include one or more of an ambient condition sensor, a location sensor, a micro-location sensor, and/or a module wearable by other subjects.

9. The method of claim 6, wherein the module group includes a third module, wherein one of the modules of the module group is configured to generate the output signals conveying the information related the machinery operable by the subject, wherein the information related the machinery is communicated to the watch via the modules of the module group, further comprising:
   determining an interior temperature of a vehicle based on the information related to the machinery, wherein the machinery includes the vehicle; and effectuating, via the watch, presentation of a notification related to the interior temperature.

10. The method of claim 9, wherein the machinery includes one or more of the vehicle or a power tool, wherein the vehicle may include a motor vehicle, a watercraft, an aircraft, and/or electric vehicle.

11. A system configured to provide a watch as a dashboard of a plurality of modules by utilizing a mesh protocol, the system comprising:
- a module group of one or more modules configured to generate output signals conveying information related to biometrics of the subject, wherein the one or more modules of the module group are wearable by the subject such that the module group includes a first module wearable by the subject, wherein the modules wearable by the subject include at least an insole module and/or a chest module, wherein the one or ore modules are configured by a mesh protocol to communicate the information via wireless communication;
- a watch including one or more processors, the first module, and a transmitter receiver, wherein the transmitter receiver communicates via the mesh protocol such that connections between the watch and the one or more modules facilitate communication between the watch and the one or more modules via the mesh protocol, wherein the one or more processors are configured by machine-readable instructions to:
- receive the wireless communication from at least one of the modules of the module group via the mesh protocol;
- obtain the output signals from the module group based on the mesh protocol;
- perform analysis on the output signals to determine values to a future fitness metric of the subject, wherein the future fitness metric corresponds to a general state of health of the subject at a particular point in time in the future to perform particular physical movements; and
- effectuate, via a user interface of the watch, presentation of the values to the future fitness metric.

\* \* \* \* \*